United States Patent [19]
Fichou et al.

[11] Patent Number: 6,159,390
[45] Date of Patent: *Dec. 12, 2000

[54] TREATED MINERAL FILLERS SUSPENSIONS OF THESE FILLERS IN POLYOLS AND THEIR USES IN POLYURETHANE FOAMS

[75] Inventors: Jean-Pierre Fichou, Levallois Perret; Maurice Husson, Chalons sur Marne; Georges Ravet, Saint-Genis-les-Ollieres; Pierre Blanchard, Reyrieux, all of France

[73] Assignee: Omya S.A., Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,488

[22] Filed: Jan. 31, 1996

[30] Foreign Application Priority Data

Jan. 31, 1995 [FR] France .................................. 95 01304

[51] Int. Cl.[7] ........................... B01F 17/14; B01F 17/42; B01F 3/12; C09K 3/00
[52] U.S. Cl. ................................. 252/182.24; 252/182.3; 516/31; 516/33; 516/34; 516/199; 521/107; 524/140; 524/145; 524/147; 524/710; 528/51; 528/72
[58] Field of Search .................................. 252/1, 182.24, 252/182.3; 521/107; 524/140, 145, 147, 710; 528/51, 72; 516/31, 33, 34, 199

[56] References Cited

U.S. PATENT DOCUMENTS

| | | |
|---|---|---|
| 4,183,843 | 1/1980 | Koenig et al. ........................ 428/403 |
| 4,251,436 | 2/1981 | Silberberg et al. ..................... 524/141 |
| 4,931,195 | 6/1990 | Cao et al. ................................ 252/8.8 |
| 5,134,175 | 7/1992 | Lucey ...................................... 522/76 |
| 5,180,757 | 1/1993 | Lucey ...................................... 522/76 |
| 5,232,551 | 8/1993 | Hornfeck et al. ......................... 162/5 |
| 5,306,739 | 4/1994 | Lucey ...................................... 522/42 |
| 5,412,139 | 5/1995 | Blanchard et al. ..................... 558/186 |
| 5,464,895 | 11/1995 | Blanchard et al. ..................... 524/425 |

FOREIGN PATENT DOCUMENTS

| | | |
|---|---|---|
| 667 292 | 1/1966 | Belgium . |
| 670 958 | 4/1966 | Belgium . |
| 0 029 137 | 5/1981 | European Pat. Off. . |
| 0 216 516 | 4/1987 | European Pat. Off. . |
| 0 496 150 | 7/1992 | European Pat. Off. . |
| 2 286 179 | 4/1976 | France . |
| 17 92 798 | 8/1977 | Germany . |
| 1 169 352 | 11/1969 | United Kingdom . |

OTHER PUBLICATIONS

Database WPI, Derwent Publications, AN–83–816675, JP–A–58 168 663, Oct. 5, 1983.
Database WPI, Derwent Publications, AN–91–248028, JP–A–03 074 472, Mar. 29, 1991.
Database WPI, Derwent Publications, AN–87–238838, JP–A–62 161 862, Jul. 17, 1987.

*Primary Examiner*—Rabon Sergent
*Attorney, Agent, or Firm*—Oblon, Spivak, McClelland, Maier & Neustadt, P.C.

[57] ABSTRACT

Method for the treatment of mineral fillers using organic phosphate treatment agents. Treated mineral fillers obtained by said method and suspension of these treated mineral fillers in polyols. Use of these suspensions in the manufacture of flexible, semirigid, or rigid polyurethane foams used for the manufacture of molded or nonmolded objects.

12 Claims, No Drawings

TREATED MINERAL FILLERS SUSPENSIONS OF THESE FILLERS IN POLYOLS AND THEIR USES IN POLYURETHANE FOAMS

BACKGROUND OF THE INVENTION

1. Field of the Invention

The invention relates to a method for the treatment of mineral fillers using organic phosphate treatment agents.

The invention also relates to the mineral fillers so treated and that can be suspended in a polyol.

The invention also relates to such suspensions of these treated mineral fillers in polyols, as well as to their use in the manufacture of flexible, semirigid, or rigid polyurethane foams.

Finally, the invention relates to the use of flexible, semirigid, or rigid polyurethane foams containing these treated mineral fillers in the manufacture of molded or nonmolded objects.

2. Description of the Prior Art

To decrease the cost price per liter and per kilogram of molded or nonmolded objects made from flexible, semirigid, or rigid polyurethane foams, it has been increasingly necessary to increase the quantity of filler present in the flexible, semirigid, or rigid polyurethane foams while at the same time preserving or improving their physicochemical properties, such as, compression, or their aesthetic or other properties, such as fire retardation, which are desired in various fields of industry such as, notably, transports (for example, cars and furniture) and in construction or other fields.

Several methods exist today to introduce mineral fillers, such as calcium carbonate, into these polyurethane compounds.

In a first type of method (French Patent No. 2,651,238), calcium carbonate is introduced into a plasticizer for polyurethane. However, this method for obtaining a suspension of a filler in a plasticizer, which permits increasing the content of the filler in the polyurethane compound, is not suitable for the following reasons. Its cost is high and its use is excessively difficult in the manufacture of flexible, semirigid, or rigid polyurethane foams. In addition, the physicochemical properties of the foams obtained from such suspensions are degraded.

Applicants have invented a method which completely favors the introduction of mineral fillers into flexible, semirigid, or rigid polyurethane foams using an inexpensive, simple means that does not result in any problems involving a significant decrease in the reactivity of the polyurethane foams.

Applicants' method is an improvement over other methods for the introduction of the filler into the polyol, one of the constituents of the polyurethane, that are known to a person skilled in the art.

A first type of method discloses grafting of methacrylic acid (German Patent Nos. 2,654,746, 2,714,291, and 2,739,620) or of another vinyl compound such as styrene on the polyol. However, this type of method does not allow the use of a suspension of calcium carbonate in the polyol because the suspension is too difficult to handle as a result of an excessively high viscosity and a poor distribution of the filler in the medium.

Another type of method involves treating the filler at the surface prior to its introduction into the polyol by means of an agent that is, for example, an alcohol with 8–14 carbon atoms (French Patent No. 2,531,971) or a hydroxycarboxylic acid phosphate (European Patent No. 0,202,394).

However, these methods produce the same type of drawbacks as those cited above since the user is confronted with problems of poor dispersibility—in the polyol—of the mineral filler so treated.

Thus, the techniques heretofore known do not solve the problem of suspending mineral fillers in the polyol, which mineral fillers are intended to be used in the manufacture of flexible, semirigid, or rigid polyurethane foams.

SUMMARY OF THE INVENTION

In order to solve this problem, the applicant developed a method for the treatment of a mineral filler by means of at least one organic phosphate treatment agent, as well as a mineral filler so treated that allows, in an unexpected manner, for the production of a suspension of a mineral filler in polyols with a high content of the filler and a low viscosity; that is, a homogeneous suspension not subject to serious sedimentation, decanting, or thickening in the manufacture of flexible, semirigid, or rigid polyurethane foams.

Thus, one of the objectives of the invention is the development of a method for the treatment of mineral fillers for use in a suspension in polyols, using at least one treatment agent of the organic phosphate type with the general formula (I):

$$\begin{array}{c} O \\ \| \\ HO-P-O-(X-O)_m-(Y-O)_n-R_1 \\ | \\ O-(X-O)_p-(Y-O)_q-R_2 \end{array}$$

with $R_1$=H, $C_8$–$C_{40}$ alkyl, or $C_6$–$C_{40}$ aryl, alkylaryl, or arylalkyl radical, with $R_2$=$C_8$–$C_{40}$ alkyl or $C_6$–$C_{40}$ aryl, alkylaryl, or arylalkyl radical

X=—$CH_2$—$CH_2$—

Y=

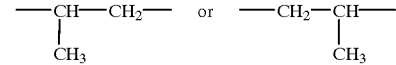

(m+n) varies from 0 to 30 with m≦30 and n≦30
(p+q) varies from 0 to 30 with p≦30 and q≦30

Another objective of the invention is the development of these treated mineral fillers which exhibit an uptake of polyol which is decreased by at least 15%, preferably at least 20%, with respect to uptake of polyol using the untreated mineral filler, while at the same time preserving the hydrophilicity of the untreated mineral fillers.

Another objective of the invention is the development of homogeneous, stable, and low-viscosity suspensions of these treated mineral fillers in the polyols, characterized by a concentration by weight of mineral fillers that can be up to 80% and a treatment agent content up to 0.5–3 wt % based on the dry weight of the filler.

These homogeneous, stable, and low-viscosity suspensions according to the invention can easily be handled because, under normal conditions of use, they present no decanting phenomenon, that is, no separation into two phases; no sedimentation, that is, no presence of a hard deposit at the bottom of the vessel in which the suspension is stored; and no serious thickening, thus allowing for the production of flexible, semirigid, or rigid polyurethane foams with excellent physicochemical properties.

Finally, another objective of the invention is the use of these homogeneous, stable, and low-viscosity suspensions of mineral fillers in the manufacture of flexible, semirigid, or rigid polyurethane foams as well as the use of said foams in the manufacture of molded or nonmolded objects.

DESCRIPTION OF THE PREFERRED EMBODIMENTS

These objectives are attained by a preferred treatment method according to which at least one treatment agent with the general formula (I) is mixed with the mineral filler to be treated so as to obtain a homogeneity factor (HF) of less than 0.2, preferably less than 0.10, and very preferably less than 0.05, with said factor being defined as the difference in weight between the retained material during dry sieving of the treated fillers and the retained material during dry sieving of nontreated fillers, which is expressed by the formula:

$$HF = \frac{\text{(weight of the treated filler that remained on the sieve)}}{\text{(weight of the test sample of the treated filler)}} - \frac{\text{(weight of the nontreated filler that remained on the sieve)}}{\text{(weight of the test sample of the nontreated filler)}}$$

and measured by the use of a sieve according to the standard NF X11-501 (325 mesh size). (This standard is publicly available at AFNOR, the French organization of standards.)

This method for measuring the retained quantity during dry sieving involves weighing very precisely 100 g of the filler test sample, followed by pouring the sample into the sieve with a size of 325 mesh.

The sieve is then placed on a mechanical sieve marketed by the company RETSCH GmbH as type 3D and driven, for 30 min, in an oscillatory motion corresponding to a graduation from 50 to 100. After 30 min, the dry retained quantity remaining on the sieve is subjected to the moderate action of a brush in accordance with the standard NF T30-024 so as not to destroy the agglomerates present on the surface of the sieve.

The retained quantity is thus determined by the ratio of the weighed amount of the filler remaining on the sieve to the precise weight of the filler poured onto the sieve.

The mineral fillers so treated, according to the invention, are selected from calcium carbonates of natural or synthetic origin, magnesium carbonate, zinc carbonate, mixed salts of magnesium and calcium such as dolomites, limestone, magnesia, barium sulfate, calcium sulfates, magnesium and aluminum hydroxides, silica, wollastonite, clays and other silica-alumina compounds such as kaolins, silico-magnesia compounds such as talc, mica, solid or hollow glass beads, metallic oxides such as zinc oxide, iron oxides, titanium oxide and, more particularly, those selected from natural or precipitated calcium carbonates such as chalk, calcite, marble, dolomites, aluminum hydroxide, magnesium hydroxide, talc, or mixtures thereof.

The mineral fillers according to the invention differ from the prior art by the fact that they preserve their hydrophilicity while at the same time having an uptake of polyol that is decreased by at least 15%, preferably by at least 20%, with respect to the nontreated mineral filler and, more particularly, in that they are obtained by the treatment method according to the invention.

The polyols used include polyether and polyester polyols.

The polyether polyols that can be used in the present invention include, for example, products made from the addition of propylene oxide to a simple polyol such as glycol, glycerol, trimethylolpropane, and sorbitol in the presence or absence of ethylene oxide; polyether polyols with an amino base, obtained by the addition of propylene oxide or ethylene oxide to amines; halogenated polyether polyols; grafted polyether polyols resulting from the copolymerization of styrene and acrylonitrile in a suspension in a polyether; or polytetramethylene glycol.

The polyester polyols that may be used in the present invention include, for example, those resulting from the polycondensation of polyalcohols with polyacids or their anhydrides such as diacids (for example, adipic acid, phthalic acid), or other acids, which react with diols (for example, ethylene glycol, propylene glycol, butylene glycol, or others) triols (for example, glycerol, trimethylolpropane, or others), and tetrols (for example, pentaerythritol or others), alone or in a mixture.

The polyols also include various hydroxylated compounds such as hydroxylated polybutadienes, prepolymers with hydroxy terminals (resulting from the reaction of an excess of polyol with a diisocyanate), or simple polyols such as glycerol or amino alcohols used in a small quantity with the polyether polyols or polyester polyols to increase the degree of crosslinking.

The uptake of polyol, which reflects the power of absorption of the fillers, is by definition the number of milliliters or grams of polyol used per 100 g or 100 mL of filler matter under the measurement conditions of the test determined by a method derived from the ISO 787/5 standard.

The suspensions of mineral fillers in the polyols according to the invention, which can also contain other mineral and/or organic products such as catalysts and/or antioxidants and/or others, are characterized in that (1) the dry-matter concentration of the treated mineral materials is up to 80 wt % of the suspension; (2) the suspensions present no significant decanting, sedimentation, or thickening after storage at rest for 7 days prior to the manufacture of flexible, semirigid, or rigid polyurethane foams, that is, they have an apparent Brookfield viscosity that is stable and less than that of the suspensions of nontreated mineral fillers; and (3) they contain 0.5–3 wt %, based on the weight of the mineral filler, of a treatment agent with the general formula (I), preferably 0.7–1.5 wt %.

The suspensions so filled, which are homogeneous, stable, and have a low viscosity, according to the invention, are capable of use in the manufacture of flexible, semirigid, or rigid polyurethane foams.

In addition, these flexible, semirigid, or rigid polyurethane foams are used for the preparation of molded or nonmolded objects.

Having generally described this invention, a further understanding can be obtained by reference to certain specific examples which are provided herein for purposes of illustration only and are not intended to be limiting unless otherwise specified.

EXAMPLE 1

This example illustrates different procedures for the treatment of mineral fillers using one particular treatment agent, as well as the homogeneity factor obtained for each of the treatments. This example demonstrates the importance of intimate mixing of the filler and treatment agent in order to obtain the desired low HF.

Test No. 1:

This test illustrates the treatment of a natural calcium carbonate according to a known method.

Thus, in a GUITTARD mixer of type ML2 with a zone for preheated mixing, 1000 g of a natural calcium carbonate sold by the company OMYA S.A. under the name of MILLICARB and 50 g of a stearyl alcohol acid phosphate are introduced.

The GUITTARD mixer is a paste blender equipped with a transverse stirring system with a "Z" shape rotating at low speed.

The mixture is then allowed to mix for 20 min at the speed of 47 rpm.

The calcium carbonate powder so treated is then cooled for the dry sieving test over a sieve with a mesh size of 325. The retained quantity after sieving is 25 g per 100 g of treated calcium carbonate, whereas the retained quantity following sieving of the starting calcium carbonate is 0.01 g per 100 g of nontreated calcium carbonate.

The homogeneity factor HF is then equal to $$\frac{25}{100} - \frac{0.01}{100} = 0.2499$$

Test No. 2:

This test illustrates another procedure for the treatment of a natural calcium carbonate.

Thus, in a mixer of the GUEDU type, 1000 g of a natural calcium carbonate sold by the company OMYA S.A. under the name of MILLICARB and 50 g of granulates of a stearyl alcohol acid phosphate are introduced. The mixture is then allowed to mix for 20 min at the speed indicated by the reference F on the GUEDU mixer.

GUEDU is the name of a French company. The GUEDU mixer is a powder blender equipped with an impeller rotating at the bottom of the blender. This mixer contains only one blade which rotates at high speed. The graduation of the speed is in the range of A (lowest speed) to H (highest speed).

The calcium carbonate powder so treated is then cooled for the dry sieving test over the sieve with a size of 325 mesh. The quantity retained after sieving is 50 g per 100 g of treated calcium carbonate, whereas the quantity retained after sieving of the starting calcium carbonate is 0.01 g per 100 g of nontreated calcium carbonate.

The homogeneity factor HF is then equal to $$\frac{50}{100} - \frac{0.01}{100} = 0.4999$$

Test No. 3

This test illustrates another procedure for the treatment of a natural calcium carbonate.

Thus, in a GUEDU mixer of the type used in Test No. 2, 1000 g of a natural calcium carbonate sold by the company OMYA S.A. under the name of MILLICARB and 50 g of a stearyl alcohol acid phosphate in powder form are introduced. The mixture is then allowed to mix for 20 min, with the speed being that of the reference F on the GUEDU mixer.

The calcium carbonate powder so treated is then cooled for the dry sieving test over the sieve with a size of 325 mesh. The quantity retained after sieving is 43 g per 100 g of treated calcium carbonate, whereas the quantity retained after sieving of the starting calcium carbonate is 0.01 g per 100 g of nontreated calcium carbonate.

The homogeneity factor HF is then equal to $$\frac{43}{100} - \frac{0.01}{100} = 0.4299$$

Test No. 4:

This test illustrates another procedure for the treatment of a natural calcium carbonate.

Thus, in a GUEDU mixer of the type used in Test No. 2, 1000 g of a natural calcium carbonate sold by the company OMYA S.A. under the name of MILLICARB and 50 g of a stearyl alcohol acid phosphate in the molten state are introduced.

The mixture is allowed to mix for 20 min before the measurements of the retained quantities following dry sieving are made. The quantity retained after sieving is 57 g per 100 g of treated calcium carbonate, whereas the quantity retained after sieving of the starting calcium carbonate is 0.01 g per 100 g of nontreated calcium carbonate.

The homogeneity factor HF is then equal to $$\frac{57}{100} - \frac{0.01}{100} = 0.5699$$

Test No. 5:

This test illustrates another procedure for the treatment of a natural calcium carbonate according to the invention.

Thus, in the heated enclosure of a GUEDU mixer of the type used in Test No. 2, 1000 g of a natural calcium carbonate sold by the company OMYA S.A. under the name of MILLICARB are introduced, followed, a few minutes later, by 10 g of a stearyl alcohol acid phosphate.

The mixture is then allowed to mix at about 90° C. for 30 min at the speed corresponding to the reference G on the GUEDU mixer.

The calcium carbonate powder so treated is then cooled for the dry sieving test over the sieve with a size of 325 mesh. The quantity retained after sieving is 4.8 g per 100 g of treated calcium carbonate, whereas the quantity retained after sieving of the starting calcium carbonate is 0.01 g per 100 g of nontreated calcium carbonate.

The homogeneity factor HF is then equal to $$\frac{4.8}{100} - \frac{0.01}{100} = 0.0479$$

Test No. 6:

This test illustrates the treatment of a natural calcium carbonate with a different granulometry and according to a known method.

Thus, in the GUITTARD mixer used in Test No. 1, 1000 g of a natural calcium carbonate sold by the company OMYA S.A. under the name of HYDROCARB and 30 g of a stearyl alcohol acid phosphate are introduced.

The mixture is then allowed to mix for 20 min at the speed of 47 rpm.

The calcium carbonate powder so treated is then cooled for the dry sieving test over the sieve with a size of 325 mesh. The quantity retained after sieving is 48 g per 100 g of treated calcium carbonate, whereas the quantity retained after sieving of the starting calcium carbonate is 0.01 g per 100 g of nontreated calcium carbonate.

The homogeneity factor HF is then equal to $$\frac{48}{100} - \frac{0.01}{100} = 0.4799$$

Test No. 7:

This test illustrates the treatment of a natural calcium carbonate according to the invention.

Thus, in the preheated enclosure of a GUEDU mixer of the type used in Test No. 2, 1000 g of a natural calcium carbonate sold by the company OMYA S.A. under the name of HYDROCARB are added, followed, after a few minutes, by 10 g of a stearyl alcohol acid phosphate.

The mixture is then allowed to mix at about 90° C. for 30 min at the speed corresponding to the reference G of the GUEDU mixer.

The calcium carbonate powder so treated is then cooled for the dry sieving test over the sieve with a size of 325 mesh. The quantity retained after sieving is 9 g per 100 g of treated calcium carbonate, whereas the quantity retained after sieving of the starting calcium carbonate is 0.01 g per 100 g of nontreated calcium carbonate.

The homogeneity factor HF is then equal to $$\frac{9}{100} - \frac{0.01}{100} = 0.0899$$

Test No. 8:

This test illustrates the treatment of a synthetic calcium carbonate by a known method.

Thus, under the same operating conditions and using the same equipment as in Test No. 1, 600 g of precipitated calcium carbonate sold by the company SOLVAY under the name SOCAL P2 and 18 g of stearyl alcohol acid phosphate are mixed. For the measurements of the quantities retained after sieving using the same equipment and the same operating conditions as in the preceding tests.

The homogeneity factor HF obtained is equal to $$\frac{64}{100} - \frac{0.5}{100} = 0.635$$

Test No. 9:

This test illustrates the treatment of a synthetic calcium carbonate by the method according to the invention using the same equipment and the same protocol as in Test No. 5, as well as the same starting filler as in the preceding test.

The measurements of the quantities retained after sieving made under the same conditions and with the same equipment as in the preceding tests lead to a homogeneity factor HF equal to $$\frac{19.5}{100} - \frac{0.5}{100} = 0.19$$

EXAMPLE 2

This example illustrates the treatment of a natural calcium carbonate with a well-defined granulometry with different treatment agents. The granulometry of this natural calcium carbonate marketed by the company OMYA S.A. under the name of OMYALITE 50 is such that 50 wt % of the particles have an average diameter of less than 2 $\mu$m, measured using the Sedigraph 5100 granulometer.

This treatment is conducted for all the tests by means of a mixture of 1 wt % of agent with respect to the weight of the calcium carbonate for a few minutes by means of a mixer of the GUEDU type and using the protocol of Test No. 5.

Once these treated fillers are obtained, uptake of polyol and hydrophobicity of the treated fillers were measured using the same equipment and the same protocol for each test.

Thus, to measure the uptake or the absorption power of the polyol, approximately 5 g of the filler to be analyzed, in powder form, are weighed to the nearest 0.1 g, then placed on a coarsened and matted glass plate. Using a burette, 1 mL of the polyol with a molecular weight of 3400, a viscosity at 25° C. of 510 mPa sec and a hydroxy index of 48 is added, then the powder and the polyol are mixed under moderate pressure using a steel spatula.

The final addition of polyol is only done in small doses of 0.05 mL.

By trituration, and also after each addition of a dose of polyol, the mixture is homogenized until it forms a consistent paste, which is, however, not yet adhesive and presents a uniform color without dark spots, indicating an enrichment in polyol.

The final absorption point is reached when small rolls form after the paste is pushed with a spatula at an angle of approximately 45° with respect to the glass plate.

The uptake or absorption of polyol is then given by the formula:

$$\frac{(\text{consumption of polyol in mL} \times (1.02 = \text{polyol density}) \times 100)}{(\text{weight of the sample in g})}$$

To conduct the hydrophobicity test, a beaker or a test tube is used, into which approximately 450 mL of clear water at ambient temperature are poured before the addition of 50 g of the filler to be tested and before the stirring of the mixture.

If, after standing for at least 2 min, a very slight deposit forms at the bottom of the container and nearly all the nonwetted powder is present at the surface of the water, the filler tested is considered to be hydrophobic. Otherwise, the filler is hydrophilic.

Test No. 10:

This test is a control test and uses calcium carbonate with a granulometry, determined by a Sedigraph 5100 granulometer, such that 50 wt % of the particles have an average diameter of less than 2 $\mu$m.

Test No. 11:

This test uses as the treatment agent, a mixture of fatty acids marketed by the company UNICHEMA under the name of PRISTERENE 4911.

Test No. 12:

This test illustrates the invention and uses as the treatment agent, stearyl alcohol acid phosphate.

Test No. 13:

This test illustrates the invention and uses as the treatment agent, poly (5)-oxyethylenated decyl alcohol acid phosphate.

Test No. 14:

This test illustrates the invention and uses as the treatment agent, poly (5)-oxyethylenated decyl alcohol phosphate, neutralized with ammonia.

Test No. 15:

This test illustrates the invention and uses as the treatment agent, a poly (4)-oxyethylenated, poly (3)-oxypropylated $C_{13}$ alcohol acid phosphate.

Test No. 16:

This test illustrates the invention and uses as the treatment agent, poly (10)-oxyethylenated nonylphenol acid phosphate.

Test No. 17:

This test illustrates the invention and uses as the treatment agent, poly (17)-oxyethylenated nonylphenol acid phosphate.

Test No. 18:

This test illustrates the invention and uses as the treatment agent, poly (30)-oxyethylenated nonylphenol acid phosphate.

Test No. 19:

This test illustrates the invention and uses as the treatment agent, a poly (25)-oxyethylenated $C_{32}$ alcohol acid phosphate.

The results of the measurements of the hydrophobicity and of the uptake of polyol of the different tests are listed in Table I below.

Test No. 21:

This test illustrates the invention and uses the MILLICARB of Test No. 20 with 1 wt % of stearyl alcohol acid phosphate.

Test No. 22:

This test illustrates the invention and uses the MILLICARB of Test No. 20 with 1 wt % of poly (5)-oxyethylenated decyl alcohol acid phosphate.

Test No. 23:

This test is a control test that relates to a natural calcium carbonate with a different granulometry. It is the natural calcium carbonate sold by the company OMYA S.A. under the name of HYDROCARB. The granulometry of this carbonate, determined by a Sedigraph 5100, is such that 58 wt % of the particles have an average diameter of less than 2 $\mu$m.

TABLE I

|  | Test No. | TYPE OF FILLER | Sédigraph 5100 granulometer (% <2 $\mu$m) | Absorption Power of Polyol | Hydrophobicity |
|---|---|---|---|---|---|
| Control | 10 | Nontreated OMYALITE 50 | 50 | 24.6 | NO |
|  | 11 | OMYALITE 50 + 1% PRISTERENE 4911 | 50 | 16.6 | YES |
| INVENTION | 12 | OMYALITE 50 + 1% $C_{18}$ alcohol acid phosphate | 50 | 19 | NO |
| INVENTION | 13 | OMYALITE 50 + 1% $C_{10}$ alcohol acid phosphate 5 EO | 50 | 18.6 | NO |
| INVENTION | 14 | OMYALITE 50 + 1% $C_{10}$ alcohol phosphate 5 EO, neutralized with $NH_3$ | 50 | 18.4 | NO |
| INVENTION | 15 | OMYALITE 50 + 1% $C_{13}$ alcohol acid phosphate-4 EO-3 PO | 50 | 18.6 | NO |
| INVENTION | 16 | OMYALITE 50 + 1% nonylphenol acid phosphate 10 EO | 50 | 19.7 | NO |
| INVENTION | 17 | OMYALITE 50 + 1% nonylphenol acid phosphate 17 EO | 50 | 15.3 | NO |
| INVENTION | 18 | OMYALITE 50 + 1% nonylphenol acid phosphate 30 EO | 50 | 18.6 | NO |
| INVENTION | 19 | OMYALITE 50 + 1% $C_{32}$ alcohol acid phosphate 25 EO | 50 | 14.9 | NO |

EO = ethylene oxide
PO = propylene oxide

A review of Table I shows that the calcium carbonates, with a granulometry such that 50 wt % of the particles have an average diameter of less than 2 $\mu$m, which were treated according to the invention, are all hydrophilic and have a polyol uptake decreased by at least 15% with respect to the nontreated filler, whereas the treated filler of the prior art does not present these two characteristics simultaneously.

These two characteristics, which are particular to the fillers according to the invention, reflect an improvement of the properties necessary in practice to be able to use fillers without problems in the manufacture of flexible, semirigid, or rigid polyurethane foams.

EXAMPLE 3

This example illustrates the treatment of calcium carbonates with different granulometries and different origins.

The treatment and measurements of the different characteristics were conducted for the different tests using the same equipment and the same operating conditions as in Example 2.

Test No. 20:

This test is a control test that uses a natural calcium carbonate marketed by the company OMYA S.A. under the name of MILLICARB and with a granulometry such that 36 wt % of the particles have an average diameter of less than 2 $\mu$m measured using the Sedigraph 5100.

Test No. 24:

This test illustrates the invention and uses the HYDROCARB of Test No. 23 with 1 wt % of stearyl alcohol acid phosphate.

Test No. 25:

This test illustrates the invention and uses the HYDROCARB of Test No. 23 with 1 wt % of poly (5)-oxyethylenated decyl alcohol acid phosphate.

Test No. 26:

This test is a control test for precipitated calcium carbonate sold by the company SOLVAY under the name of SOCAL P2 and with a granulometry, determined using a Sedigraph 5100, such that 79 wt % of the particles have an average diameter of less than 2 $\mu$m and 69 wt % have an average diameter of less than 1 $\mu$m.

Test No. 27:

This test illustrates the invention and uses the synthetic calcium carbonate of Test No. 26 with 2.5 wt % of poly (5)-oxyethylenated decyl alcohol acid phosphate.

The results of the hydrophobicity measurements and of the uptake of polyol of the different tests are listed in Table II below.

TABLE II

| | Test No. | FILLER TYPE | Sédigraph 5100 granulometer (% <2 μm) | Sédigraph 5100 granulometer (% <1 μm) | Absorption Power of Polyol | Hydrophobicity |
|---|---|---|---|---|---|---|
| CONTROL | 20 | Nontreated MILLICARB | 36 | — | 25.5 | NO |
| INVENTION | 21 | MILLICARB + 1% $C_{18}$ alcohol acid phosphate | 36 | — | 17.4 | NO |
| INVENTION | 22 | MILLICARB + 1% $C_{10}$ alcohol acid phosphate 5 EO | 36 | — | 12.1 | NO |
| CONTROL | 23 | Nontreated HYDROCARB | 58 | — | 28.3 | NO |
| INVENTION | 24 | HYDROCARB + 1% $C_{18}$ alcohol acid phosphate | 58 | — | 19.8 | NO |
| INVENTION | 25 | HYDROCARB + 1% $C_{10}$ alcohol acid phosphate 5 EO | 58 | — | 13.7 | NO |
| CONTROL | 26 | Nontreated SOCAL P2 | 79 | 69 | 41.6 | NO |
| INVENTION | 27 | SOCAL P2 + 2.5% $C_{10}$ alcohol acid phosphate 5 EO | 79 | 69 | 22.6 | NO |

EO = ethylene oxide

A review of Table II shows that, regardless of the granulometry or the nature of the calcium carbonates, the filler treated according to the invention preserves its hydrophilicity and has a polyol uptake decreased by at least 15%, preferably by at least 20%, with respect to the nontreated filler, whereas the fillers of the prior art do not present these two characteristics simultaneously, which are representative of the improvement of the properties required for using the fillers in the manufacture of flexible, semirigid, or rigid polyurethane foams without problems.

EXAMPLE 4

This example illustrates the use of different mineral fillers intended to be suspended in a polyol for use in the manufacture of flexible, semirigid, or rigid polyurethane foams.

The treatments and measurements of the different characteristics were conducted for the different tests using the same equipment and the same operating conditions as in Example 2.

Test No. 28:
This test is a control using an aluminum trihydroxide marketed by the company MARTINSWERK under the name of MARTINAL OL 104 and with a granulometry determined using a Sedigraph 5100, and which is such that 68 wt % of the particles have a diameter of less than 2 μm and 23 wt % have an average diameter of less than 1 μm.

Test No. 29:
This test uses the aluminum hydroxide of Test No. 28 with 1 wt % stearine and corresponds to the commercial product sold by the company MARTINSWERK under the name of MARTINAL OL 104C.

Test No. 30:
This test illustrates the invention and uses the aluminum trihydroxide of Test No. 28 with 1 wt % of poly (5)-oxyethylenated decyl alcohol acid phosphate.

Test No. 31:
This test is a control using magnesium hydroxide marketed by the company MARTINSWERK under the name of MAGNIFIN H5 and with a granulometry determined using a Sedigraph 5100, and which is such that 69 wt % of the particles have a diameter of less than 2 μm and 23 wt % have an average diameter of less than 1 μm.

Test No. 32:
This test uses the magnesium hydroxide of Test No. 31 with 1 wt % of a mixture of fatty acid marketed by the company UNICHEMA under the name of PRISTERENE 4911.

Test No. 33:
This test illustrates the invention and uses the magnesium hydroxide of Test No. 31 with 1 wt % of poly (5)-oxyethylenated decyl alcohol acid phosphate.

Test No. 34:
This test is a control using a talc with a granulometry, measured using a Sédigraph 5100, such that 20 wt % of the particles have an average diameter of less than 2 μm and 6 wt % have an average diameter particle of less than 1 μm.

Test No. 35:
This test illustrates the invention and uses the talc of Test No. 34 with 1 wt % of poly (5)-oxyethylenated decyl alcohol acid phosphate.

The results of the measurements of hydrophobicity and of the uptake of polyol of the different tests are listed in the following Table III:

TABLE III

| | Test No. | TYPE OF FILLER | Sédigraph 5100 granulometer (% <2 μm) | Sédigraph 5100 granulometer (% <1 μm) | Absorption Power of Polyol | Hydrophobicity |
|---|---|---|---|---|---|---|
| CONTROL | 28 | Nontreated MARTINAL OL 104 | 68 | 23 | 39.2 | NO |
| | 29 | MARTINAL OL 104C | 68 | 23 | 26.5 | YES |
| INVENTION | 30 | MARTINAL OL 104 + 1% $C_{10}$ alcohol acid phosphate 5 EO | 68 | 23 | 25.9 | NO |
| CONTROL | 31 | Nontreated MAGNIFIN H5 | 69 | 23 | 36.7 | NO |
| | 32 | MAGNIFIN H5 + 1% PRISTERENE 4911 | 69 | 23 | 30.1 | YES |
| INVENTION | 33 | MAGNIFIN H5 + 1% $C_{10}$ alcohol acid phosphate 5 EO | 69 | 23 | 29.4 | NO |

TABLE III-continued

| | Test No. | TYPE OF FILLER | Sédigraph 5100 granulometer (% <2 μm) | Sédigraph 5100 granulometer (% <1 μm) | Absorption Power of Polyol | Hydrophobicity |
|---|---|---|---|---|---|---|
| CONTROL | 34 | Nontreated talc | 20 | 6 | 38.4 | NO |
| INVENTION | 35 | Talc + 1% $C_{10}$ alcohol acid phosphate 5 EO | 20 | 6 | 32.6 | NO |

EO = ethylene oxide

A review of Table III shows that regardless of the type of filler, the filler treated according to the invention preserves its hydrophilicity and possesses a polyol uptake that is decreased by at least 15%, preferably by at least 20%, with respect to the nontreated filler, whereas the fillers of the prior art do not present these characteristics simultaneously, which are representative of the improvement of the properties required for the use, without problems, of fillers in the manufacture of flexible, semirigid, or rigid polyurethane foams.

EXAMPLE 5

This example illustrates the use of differing quantities of treatment agent in the polyols, measured as a percentage with respect to calcium carbonate used as the mineral filler.

For all the tests of the example, the calcium carbonate used is the same as that of Example 2, that is, the natural calcium carbonate with a granulometry measured using the Sedigraph 5100 granulometer, which is such that 50 wt % of the particles have an average diameter of less than 2 μm and which is marketed by OMYA S.A. under the name of OMYALITE 50.

Similarly, for each test, the treatment of the filler is conducted under the same operating conditions as in Example 2 and with the same apparatus.

Once the treatment is made for each of the tests with a different quantity of treatment agent, 100 g of polyol with a molecular weight of 3000 and a hydroxy index of 55 is introduced into a 500 mL beaker, equipped with a stirrer that rotates at 500 rpm. The polyol is then stirred for 1 min before the introduction of 100 g of the treated filler and the stirring is continued for 5 min at 700 rpm. The suspension so prepared is allowed to stand for 2 h.

After 2 h, the measurements of the viscosity of the suspension in the polyol at 21° C. are measured at 10 rpm and at 100 rpm using a Brookfield viscosimeter of the RVT type equipped with the adequate spindle.

The suspension is then allowed to stand for 24 h before proceeding again to a measurement of the viscosity under the same conditions as above. After 7 days of storage of the suspension, the absence of sedimentation is determined, on the one hand, using a spatula immersed to the bottom of the suspension and, on the other hand, the absence of decanting is determined by visual inspection.

Thus, the different tests conducted within the context of this example use different quantities of poly (5)-oxyethylenated decyl alcohol acid phosphate and are as follows:

Test No. 36:
This constitutes the control test and uses the above nontreated calcium carbonate.
Test No. 37:
This test uses a percentage of 0.4 wt %.
Test No. 38:
This test uses a percentage of 0.6 wt %.
Test No. 39:
This test uses a percentage of 0.8 wt %.
Test No. 40:
This test uses a percentage of 1.0 wt %.
Test No. 41:
This test uses a percentage of 1.2 wt %.
Test No. 42:
This test uses a percentage of 1.4 wt %.

The results of the measurements of viscosity, decanting, and sedimentation of the different tests are listed in the following Table IV:

TABLE IV

| Test No. | 36 | 37 | 38 | 39 | 40 | 41 | 42 |
|---|---|---|---|---|---|---|---|
| $CaCO_3$ | OMYALITE 50 | OMYALITE 50 | OMYALITE 50 | OMYALITE 50 | OMYALITE 50 | OMYALITE 50 | OMYALITE 50 |
| Quantity of treatment agent (wt. %) | 0.00 | 0.40 | 0.60 | 0.80 | 1.00 | 1.20 | 1.40 |
| Quantity of $CaCO_3$ (total wt % of the suspension) | 50 | 50 | 50 | 50 | 50 | 50 | 50 |
| Quantity of polyol (total wt % of the suspension) | 50 | 50 | 50 | 50 | 50 | 50 | 50 |
| Brookfield viscosity after 2 h (mPa · sec) | | | | | | | |
| 10 Rpm | 4200 | 4000 | 3800 | 3080 | 2800 | 2960 | 4000 |
| 100 Rpm | 3200 | 2920 | 2850 | 2600 | 2460 | 2480 | 2620 |

TABLE IV-continued

| Test No. | 36 | 37 | 38 | 39 | 40 | 41 | 42 |
|---|---|---|---|---|---|---|---|
| Brookfield viscosity after 24 h (mPa · sec) | | | | | | | |
| 10 Rpm | 4400 | 3960 | 3680 | 3360 | 2960 | 3200 | 4240 |
| 100 Rpm | 3360 | 2970 | 2880 | 2740 | 2550 | 2620 | 2700 |
| Sedimentation after 7 days | Hard Deposit | Deposit not very hard | None | None | None | None | None |
| Decanting after 7 days | Yes | Slight | None | None | None | None | None |

A review of Table IV shows that according to the invention it is possible to obtain suspensions with 50 wt % of natural calcium carbonate in polyols containing 0.5–3.0 wt %, with respect to the weight of the filler, of an agent with the general formula (I), preferably between 0.7 and 1.5 wt %, which presents no significant decanting, sedimentation, or thickening.

EXAMPLE 6

This example illustrates the use of differing dry-matter concentrations for a number of different fillers.

For this purpose, using the same protocol and the same apparatus as in Example 5, the suspensions for the implementation are prepared for the following tests:

Test Nos. 43–45:

These tests illustrate suspensions of the MILLICARB of Test Nos. 20–22, in a polyol with a molecular weight of 3000 and a hydroxy index of 55.

Test No. 43:

150 g of nontreated MILLICARB and 50 g of the above-mentioned polyol to obtain a control suspension with a 75% dry-matter concentration.

Test No. 44:

150 g of the treated filler, according to the invention, of Test No. 22 and 50 g of the above-mentioned polyol to obtain a suspension, according to the invention, with a 75% dry-matter concentration.

Test No. 45:

150 g of the treated filler, according to the invention, of Test No. 21 and 50 g of the above-mentioned polyol to obtain a suspension, according to the invention, with a 75% dry-matter concentration.

Test No. 46:

In this test, OMYALITE 50 of Example 2 is prepared in a polyol with a molecular weight of 3400 and a hydroxy index 48, wherein 180 g of OMYALITE 50 treated with 1 wt % of poly (17)-oxyethylenated nonylphenol acid phosphate and mixed with 120 g of the above-mentioned polyol, to obtain a suspension, according to the invention, with a 60% dry-matter concentration.

Test No. 47:

This test uses 180 g of OMYALITE 50 treated with 1 wt % of a poly (25)-oxyethylenated $C_{32}$ alcohol acid phosphate along with 120 g of the above-mentioned polyol to obtain a suspension, according to the invention, with a 60% dry-matter concentration.

Test No. 48:

This test uses 120 g of the SOCAL P2 of Test No. 26, along with 80 g of the above-mentioned polyol to obtain a control suspension with a 60% dry-matter concentration.

Test No. 49:

This test uses 120 g of the treated SOCAL P2 of Test No. 27 and 80 g of the above-mentioned polyol to obtain a suspension, according to the invention, with a 60% dry-matter concentration.

Test No. 50:

This test uses 120 g of kaolin with a granulometry, measured using a Sedigraph 5100 granulometer, that is such that 84 wt % of the particles have an average diameter of less than 2 $\mu$m and 76 wt % have an average diameter of less than 1 $\mu$m, along with 80 g of the above-mentioned polyol to obtain a controlled suspension having a concentration of 60% by dry weight. However, during the addition of kaolin, the viscosity increases rapidly until the stirrer is locked. The performance of this control test thus shows the impossibility of obtaining a suspension of kaolin with a kaolin concentration of 60%.

Test No. 51:

This test uses 120 g of kaolin treated with 1 wt % of poly (5)-oxyethylenated decyl alcohol acid phosphate, along with 80 g of the above-mentioned polyol to obtain a suspension, according to the invention, with a 60% dry-matter concentration.

Test No. 52:

This test uses 110 g of MAGNIFIN H5 of Test No. 31, along with 80 g of a polyol with a molecular weight of 3400 and a hydroxyl index of 48 to obtain a control suspension with a concentration of 55% by dry weight. However, during the addition of the MAGNIFIN H5, the viscosity increases rapidly until the stirrer is locked. The performance of this test thus shows the impossibility of obtaining a suspension of magnesium hydroxide with a concentration of 55% of magnesium hydroxide.

Test No. 53:

This test uses 110 g of treated magnesium hydroxide, according to the invention, of Test No. 33, along with 90 g of the above-mentioned polyol to obtain a suspension, according to the invention, with a concentration of 55% of dry matter.

Test No. 54:

This test uses 90 g of the talc of Test No. 34, along with 110 g of a polyol of the amino-aromatic polyether polyol type with a molecular weight of approximately 1000 and a hydroxy index of approximately 545 to obtain a control suspension with a concentration of 45% by dry weight.

Test No. 55:

This test uses 90 g of the treated talc, according to the invention, of Test No. 35 and 110 g of the above-mentioned polyol to obtain a suspension, according to the invention, with a concentration of 55% by dry weight.

Test No. 56:

This test uses 120 g of the MARTINAL OL 104 of Test No. 28, along with 80 g of a polyol with a molecular weight of 3400 and a hydroxy index of 48 to obtain a controlled suspension with a concentration of 60% by dry weight. However, during the addition of the MARTINAL OL 104, the viscosity increases rapidly until the stirrer is locked. The performance of this control test thus shows the impossibility of obtaining a suspension of aluminum hydroxide with a concentration of 60% of aluminum hydroxide.

Test No. 57:

This test uses 120 g of treated aluminum hydroxide, according to the invention, of Test No. 30 and 80 g of the above-mentioned polyol to obtain a suspension according to the invention, at a concentration of 60% by dry weight.

Once the various suspensions are obtained (Test No. 37 to No. 52), the Brookfield viscosity measurements are conducted, at 10 rpm and 100 rpm, after 2 h, 24 h, and the decanting determination after 7 days with the same protocol and using the same viscosimeter as in Example 5.

The results obtained are listed in Tables V and VI below.

TABLE V

| Test No. | 43 CONTROL | 44 INVENTION | 45 INVENTION | 46 INVENTION | 47 INVENTION | 48 CONTROL | 49 INVENTION |
|---|---|---|---|---|---|---|---|
| Filler | MILLICARB Nontreated | MILLICARB Treated | MILLICARB Treated | MILLICARB Treated | MILLICARB Treated | MILLICARB Nontreated | MILLICARB Treated |
| Quantity of treatment agent (wt %) | 0.00 | 1.00 | 1.00 | 1.00 | 1.00 | 0.00 | 2.50 |
| Quantity of filler (total wt % of the suspension) | 75 | 75 | 75 | 60 | 60 | 60 | 60 |
| Quantity of polyol (total wt % of the suspension) | 25 | 25 | 25 | 40 | 40 | 40 | 40 |
| Brookfield viscosity after 2 h (mPa · sec) | | | | | | | |
| 10 Rpm | Not measurable | 114400 | 244800 | 13760 | 23360 | 72000 | 24000 |
| 100 Rpm | Not measurable | 53920 | 107800 | 6900 | 8900 | 58700 | 16600 |
| Brookfield viscosity after 24 h (mPa · sec) | | | | | | | |
| 10 Rpm | Not measurable | 131200 | 273000 | 13100 | 24320 | 71200 | 23200 |
| 100 Rpm | Not measurable | 62000 | 96200 | 6900 | 9380 | 59800 | 16500 |
| Sedimentation after 7 days | None | None | None | None | None | None | None |
| Decanting after 7 days | None | None | None | None | None | None | None |

"Not measurable" means that the viscosity is greater than the maximum of the graduation on the viscosimeter

TABLE VI

| Test No. | 50 CONTROL | 51 INVENTION | 52 CONTROL | 53 INVENTION | 54 CONTROL | 55 INVENTION | 56 CONTROL | 57 INVENTION |
|---|---|---|---|---|---|---|---|---|
| Filler | KAOLIN Nontreated | KAOLIN Treated | MAGNIFIN H5 Nontreated | MAGNIFIN H5 Treated | TALC Nontreated | TALC Treated | MARTINAL OL104 Nontreated | MARTINAL OL104 Treated |
| Quantity of treatment agent (wt %) | 0.00 | 1.00 | 0.00 | 1.00 | 0.00 | 1.00 | 0.00 | 1.00 |
| Quantity of filler (total wt % of the suspension) | 60 | 60 | 55 | 55 | 45 | 45 | 60 | 60 |
| Quantity of Brookfield viscosity after 24 h (mPa · sec) | | | | | | | | |
| 10 Rpm | Suspension could not be prepared | 204800 | Suspension could not be prepared | 73600 | 1700000 | 1000000 | Suspension could not be prepared | 64000 |
| 100 Rpm | Suspension could not be prepared | Not measurable | Suspension could not be prepared | 34600 | Not measurable | Not measurable | Suspension could not be prepared | 43200 |
| Sedimentation after 7 days | Suspension could not be prepared | None | Suspension could not be prepared | None | None | None | Suspension could not be prepared | None |
| Decanting after 7 days | Suspension could not be prepared | None | Suspension could not be prepared | None | None | None | Suspension could not be prepared | None |

Not measurable means that the viscosity is greater than the maximum of the graduation on the viscosimeter A review of Tables V and VI shows that, according to the invention, it is possible to obtain suspensions of different fillers in different polyols presenting no significant decanting, sedimentation, or thickening, thus allowing an easier handling of these suspensions for use in the manufacture of flexible, semirigid, or rigid polyurethane foams.

Preparative of polyurethane foams using suspensions of fillers in polyols are known, as disclosed in U.S. Pat. Nos. 4,108,791 and 4,250,077.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A suspension of hydrophilic mineral fillers, treated with a treatment agent, in a polyol, wherein a dry weight concentration of said treated hydrophilic mineral fillers is up to 80 wt % of the suspension, and wherein the treatment agent for said hydrophilic mineral fillers is present in an amount of 0.5 to 3 wt. % based upon the weight of the hydrophilic mineral fillers, and wherein said treatment agent has the formula (I):

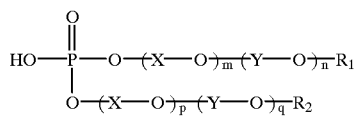

(I)

wherein:
R$_1$ is H, C$_8$–C$_{40}$ alkyl, C$_6$–C$_{40}$ aryl, alkylaryl, or arylalkyl;
R$_2$ is C$_8$–C$_{40}$ alkyl, C$_6$–C$_{40}$ aryl, alkylaryl or arylalkyl;
X is —CH$_2$—CH$_2$—;
Y is —CH(CH$_3$)—CH$_2$— or —CH$_2$—CH(CH$_3$)—;
(m+n) is from 0 to 30, with m$\leq$30 and n$\leq$30;
(p+q) is from 0 to 30, with p$\leq$30 and q$\leq$30;
wherein said mineral fillers remain hydrophilic and absorb polyol in an amount that is at least 15% by weight less, based on the total weight of the treated mineral fillers, than the amount absorbed by non-treated mineral fillers; and
wherein a homogeneity factor (HF) is less than 0.2; said homogeneity factor being measured using a 325 mesh size sieve in accordance with the NF X11-501 AFNOR standard, (HF) being defined as:

$$HF = \frac{\text{(weight of the treated filler that remained on the sieve)}}{\text{(weight of the test sample of the treated filler)}} - \frac{\text{(weight of the non-treated filler that remained on the sieve)}}{\text{(weight of the test sample of the non-treated filler)}}.$$

2. The suspension of claim 1, wherein the amount of polyol absorbed by the treated mineral fillers is at least 20 wt. % less than the amount of polyol absorbed by the non-treated mineral fillers.

3. The suspension of claim 1, wherein said HF of said treated mineral fillers is less than 0.10.

4. The suspension of claim 3, wherein said HF of said treated mineral filler is less than 0.05.

5. The suspension of claim 1, wherein said treatment agent is present in an amount of 0.7 to 1.5 wt %.

6. The suspension of claim 1, wherein the non-treated mineral filler is selected from the group consisting of calcium carbonates of natural, precipitated or synthetic origin, magnesium carbonate, calcite, marble, talc, dolomites, zinc carbonate, mixed salts of magnesium and calcium, lime, magnesia, barium sulfate, calcium sulfates, magnesium and aluminum hydroxides, silica, wollastonite, clays and other silica-alumina compounds, silica-magnesia compounds, mica, solid-, and hollow glass beads, metallic oxides, and mixtures thereof.

7. A method of preparing a dispersion of a treated mineral filler in a polyol, which comprises dispersing into said polyol said mineral filler, treated with at least one treatment agent having the formula (I):

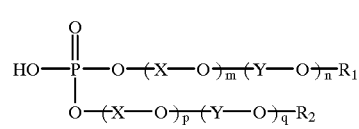

(I)

wherein:
R$_1$ is H, C$_8$–C$_{40}$ alkyl, C$_6$–C$_{40}$ aryl, alkylaryl, or arylalkyl;
R$_2$ is C$_8$–C$_{40}$ alkyl, C$_6$–C$_{40}$ aryl, alkylaryl or arylalkyl;
X is —CH$_2$—CH$_2$—;
Y is —CH(CH$_3$)—CH$_2$— or —CH$_2$—CH(CH$_3$)—;
(m+n) is from 0 to 30, with m$\leq$30 and n$\leq$30;
(p+q) is from 0 to 30, with p$\leq$30 and q$\leq$30;
wherein said mineral filler remains hydrophilic and absorbs polyol in an amount that is at least 15% by weight less, based on the total weight of the treated mineral filler, than the amount absorbed by non-treated mineral filler; and
wherein a homogeneity factor (HF) is less than 0.2; said homogeneity factor being measured using a 325 mesh size sieve in accordance with the NF X11-501 AFNOR standard, (HF) being defined as:

$$HF = \frac{\text{(weight of the treated filler that remained on the sieve)}}{\text{(weight of the test sample of the treated filler)}} - \frac{\text{(weight of the non-treated filler that remained on the sieve)}}{\text{(weight of the test sample of the non-treated filler)}}$$

wherein a dry weight concentration of said treated hydrophobic mineral filler is up to 80 wt. % of the dispersion, and wherein the treatment agent for said hydrophobic mineral filler is present in an amount of 0.5 to 3 wt. % based upon the weight of the hydrophilic mineral filler.

8. The method of claim 7, wherein the amount of polyol absorbed by the treated mineral fillers is at least 20 wt. % less than the amount of polyol absorbed by the non-treated mineral fillers.

9. The method of claim 7, wherein said HF of said treated mineral fillers is less than 0.10.

10. The method of claim 8, wherein said HF of said treated mineral fillers is less than 0.05.

11. The method of claim 7, wherein said treatment agent is present in an amount of 0.7 to 1.5 wt. %.

12. The method of claim 7, wherein the non-treated filler is selected from the group consisting of calcium carbonates of natural, precipitated or synthetic origin, magnesium carbonate, calcite, marble, talc, dolomites, zinc carbonate, mixed salts of magnesium and calcium, lime, magnesia, barium sulfate, calcium sulfates, magnesium and aluminum hydroxides, silica, wollastonite, clays and other silica-alumina compounds, silica-magnesia compounds, mica, solid-, and hollow glass beads, metallic oxides, and mixtures thereof.

* * * * *

UNITED STATES PATENT AND TRADEMARK OFFICE
CERTIFICATE OF CORRECTION

PATENT NO. : 6,159,390  
DATED : December 12, 2000  
INVENTOR(S) : Jean-Pierre Fichou, et al.

Page 1 of 4

It is certified that error appears in the above-identified patent and that said Letters Patent is hereby corrected as shown below:

Column 7,
Line 65, "the Sedigraph" should read -- the Sédigraph --.

Column 8,
Line 12, "mPa sec" should read -- mPa·sec --;
Line 42, "Sedigraph" should read -- Sédigraph --.

Column 9,
Line 67, "the Sedigraph" should read -- the Sédigraph --.

Column 10,
Lines 13 and 56, "Sedigraph" should read -- Sédigraph --.

Column 11,
Line 44, "Sedigraph" should read -- Sédigraph --.

Column 12,
Line 28, "Sedigraph" should read -- Sédigraph --.

Column 13,
Line 31, "Sedigraph" should read -- Sédigraph --.

Column 16,
Line 19, "Sedigraph" should read -- Sédigraph --.

UNITED STATES PATENT AND TRADEMARK OFFICE
CERTIFICATE OF CORRECTION

PATENT NO.    : 6,159,390
DATED         : December 12, 2000
INVENTOR(S)   : Jean-Pierre Fichou, et al.

It is certified that error appears in the above-identified patent and that said Letters Patent is hereby corrected as shown below:

Columns 17 & 18, TABLE VI

"

TABLE VI

| Test No. | 50 CONTROL | 51 INVENTION | 52 CONTROL | 53 INVENTION | 54 CONTROL | 55 INVENTION | 56 CONTROL | 57 INVENTION |
|---|---|---|---|---|---|---|---|---|
| Filler | KAOLIN Nontreated | KAOLIN Treated | MAGNIFIN H5 Nontreated | MAGNIFIN H5 Treated | TALC Nontreated | TALC Treated | MARTINAL OL104 Nontreated | MARTINAL OL104 Treated |
| Quantity of treatment agent (wt %) | 0.00 | 1.00 | 0.00 | 1.00 | 0.00 | 1.00 | 0.00 | 1.00 |
| Quantity of filler (total wt % of the suspension) | 60 | 60 | 55 | 55 | 45 | 45 | 60 | 60 |
| Quantity of Brookfield viscosity after 24 h (mPa · sec) | | | | | | | | |
| 10 Rpm | Suspension could not be prepared | 204800 | Suspension could not be prepared | 73600 | 1700000 | 1000000 | Suspension could not be prepared | 64000 |
| 100 Rpm | Suspension could not be prepared | Not measurable | Suspension could not be prepared | 34600 | Not measurable | Not measurable | Suspension could not be prepared | 43200 |
| Sedimentation after 7 days | Suspension could not be prepared | None | Suspension could not be prepared | None | None | None | Suspension could not be prepared | None |
| Decanting after 7 days | Suspension could not be prepared | None | Suspension could not be prepared | None | None | None | Suspension could not be prepared | None |

Not measurable means that the viscosity is greater than the maximum of the graduation on the viscosimeter

"

UNITED STATES PATENT AND TRADEMARK OFFICE
CERTIFICATE OF CORRECTION

PATENT NO. : 6,159,390
DATED : December 12, 2000
INVENTOR(S) : Jean-Pierre Fichou, et al.

It is certified that error appears in the above-identified patent and that said Letters Patent is hereby corrected as shown below:

<u>Columns 17 & 18, TABLE VI</u>
should read

--                                                                                       --.

TABLE VI

| Test No. | 50 CONTROL | 51 INVENTION | 52 CONTROL | 53 INVENTION | 54 CONTROL | 55 INVENTION | 56 CONTROL | 57 INVENTION |
|---|---|---|---|---|---|---|---|---|
| Filler | KAOLIN Nontreated | KAOLIN Treated | MAGNIFIN H5 Nontreated | MAGNIFIN H5 Treated | TALC Nontreated | TALC Treated | MARTINAL OL104 Nontreated | MARTINAL OL104 Treated |
| Quantity of treatment agent (wt %) | 0.00 | 1.00 | 0.00 | 1.00 | 0.00 | 1.00 | 0.00 | 1.00 |
| Quantity of filler (total wt % of the suspension) | 60 | 60 | 55 | 55 | 45 | 45 | 60 | 60 |
| Quantity of polyol (total wt% of the suspension) | 40 | 40 | 45 | 45 | 55 | 55 | 40 | 40 |
| Brookfield viscosity after 2h (mPa·sec) | | | | | | | | |
| 10 Rpm | Suspension could not be prepared | 211200 | Suspension could not be prepared | 57100 | 1450000 | 844000 | Suspension could not be prepared | 43600 |
| 100 Rpm | Suspension could not be prepared | 140600 | Suspension could not be prepared | 23400 | Not measurable | 300000 | Suspension could not be prepared | 33000 |
| Quantity of Brookfield viscosity after 24 h (mPa·sec) | | | | | | | | |

(continued on page 4)

UNITED STATES PATENT AND TRADEMARK OFFICE
CERTIFICATE OF CORRECTION

PATENT NO. : 6,159,390
DATED : December 12, 2000
INVENTOR(S) : Jean-Pierre Fichou, et al.

It is certified that error appears in the above-identified patent and that said Letters Patent is hereby corrected as shown below:

<u>Columns 17 & 18, TABLE VI</u>
should read

--                                                                                       --.

TABLE VI

| Test No. | 50 CONTROL | 51 INVENTION | 52 CONTROL | 53 INVENTION | 54 CONTROL | 55 INVENTION | 56 CONTROL | 57 INVENTION |
|---|---|---|---|---|---|---|---|---|
| 10 Rpm | Suspension could not be prepared | 204800 | Suspension could not be prepared | 73600 | 1700000 | 1000000 | Suspension could not be prepared | 64000 |
| 100 Rpm | Suspension could not be prepared | Not measurable | Suspension could not be prepared | 34600 | Not measurable | Not measurable | Suspension could not be prepared | 43200 |
| Sedimentation after 7 days | Suspension could not be prepared | None | Suspension could not be prepared | None | None | None | Suspension could not be prepared | None |
| Decanting after 7 days | Suspension could not be prepared | None | Suspension could not be prepared | None | None | None | Suspension could not be prepared | None |

Not measurable means that the viscosity is greater than the maximum of the graduation on the viscosimeter Signed and Sealed this Twenty-seventh Day of November, 2001

Attest:

NICHOLAS P. GODICI
*Attesting Officer*   *Acting Director of the United States Patent and Trademark Office*